United States Patent [19]
Nakata

[11] Patent Number: 5,182,434
[45] Date of Patent: Jan. 26, 1993

[54] LASER BEAM MACHINING METHOD

[75] Inventor: Yoshinori Nakata, Minamitsuru, Japan

[73] Assignee: Fanuc Ltd., Minamitsuru, Japan

[21] Appl. No.: 684,930

[22] PCT Filed: Aug. 29, 1990

[86] PCT No.: PCT/JP90/01098
§ 371 Date: Apr. 25, 1991
§ 102(e) Date: Apr. 25, 1991

[87] PCT Pub. No.: WO91/04124
PCT Pub. Date: Apr. 4, 1991

[30] Foreign Application Priority Data
Sep. 19, 1989 [JP] Japan .................. 1-243013

[51] Int. Cl.⁵ .............. B23K 26/00; B23K 26/14
[52] U.S. Cl. .................. 219/121.72; 219/121.67; 219/121.82; 219/121.84
[58] Field of Search .............. 219/121.67, 121.72, 219/121.76, 121.77, 121.84

[56] References Cited
U.S. PATENT DOCUMENTS 4,870,560 9/1989 Seki et al. .................. 364/474.08
4,914,599 4/1990 Seki et al. .................. 364/474.08

Primary Examiner—C. L. Albritton
Attorney, Agent, or Firm—Staas & Halsey

[57] ABSTRACT

A laser beam machining method of processing a machining path having an acute angle in a CNC laser machining apparatus. A numerical control device (CNC) previously reads a machining program, to thereby detect an acute angle not greater than an allowable angle in the machining path. A machining operation is executed under normal machining conditions before a vertex (33) of the acute angle is reached and is stopped at the vertex (33) of the acute angle, and the region near the vertex (33) is cooled for a predetermined time by a cooling medium, whereby a lowering of the cut surface roughness due to an overheating by a laser beam (7) is prevented. After the cooling, the cutting work is executed under drilling conditions to continue the machining.

3 Claims, 2 Drawing Sheets

LASER BEAM MACHINING METHOD

DESCRIPTION

1. Technical Field

The present invention relates to a laser beam machining method of processing a machining path having an acute angle by a laser beam, and more particularly, to a laser beam machining method of efficiently effecting an automatic cutting work even at an acute-angle processing portion which is susceptible to an influence of heat.

2. Background Art

In cutting work using a laser beam, the laser beam is applied to a portion of a material to be cut, and at the same time, an assist gas is blown onto that portion from a nozzle tip. When cutting a metallic material, oxygen is generally used as the assist gas so that an oxidative reaction is used in conjunction with the heat-energy processing by the laser beam, and local heat processing work is collected. When processing an acute-angle portion, however, the traveling speed of a machining table is substantially lowered, and thus the heat input in the stock per unit time is increased. Immediately after the arrival of the laser beam at the turn, in particular, the acute-angle vertex portion is melted by local heat previously produced in the stock due to heat conduction before the cutting work, and for the same reason, a considerable reduction in cut surface roughness occurs in the region near the vertex portion.

The method used to cope with this problem varies in accordance with whether the resulting product is on the side of an acute or narrower angle or on the side of a greater angle.

If the product is on the acute-angle side (inside the cutting path), a loop processing method is used. In this method, the cutting work is continued until the turn of the acute angle is cleared, the machining is continued, forming a circular arc of a suitable size or a straight line to return to the turn, and an advance for the originally intended machining is restarted. This method enables a substantial reduction of the machining speed at the acute angle, which is attributable to the correlation between the force of inertia of the machining table and a servomotor, to be lessened. If the size of the loop is increased, then the vertex of the acute angle will be cooled.

If the product is on the obtuse-angle side (outside the cutting path), on the other hand, a method is used such that the machining conditions are changed before the turn is reached, to thereby attempt to minimize the heat input, and the same operation is performed while the machining is advanced for a suitable distance from the turn.

If the product is on the acute-angle side, however, it is necessary to create a program for the path of machining at the loop processing portion, in addition to the path of the originally intended machining, and thus the size of the loop must be changed in accordance with the thickness of the material to be machined and the size of the acute angle. Moreover, since an unwanted machining is added, the material will be unduly consumed.

Furthermore, if the product is on the obtuse-angle side it is very difficult to set the machining conditions. Namely, know-how based on experience and perception is required to determine the position at which the machining conditions should be changed or the position at which the machining conditions should be restored to the original conditions, during the progress of the machining operation. Moreover, since the heat input is restricted during the machining, the operation is limited to an extent such that the cutting work becomes impossible. Also, since many changes are made in the machining conditions of this method, a complicated machining program is required, and thus a problem arises in the use thereof.

DISCLOSURE OF THE INVENTION

The present invention has been contrived in consideration of these circumstances, and an object thereof is to provide a laser beam machining method of automatically effecting an acute-angle machining without the need for a complicated machining program or the machining of unnecessary portions.

To solve the above problems, according to the present invention, there is provided a laser beam machining method of processing a machining path having an acute angle in a CNC laser machining apparatus, which laser beam machining method comprises previously reading a machining program to thereby detect that the acute angle of the machining path is not greater than a preset allowable angle, moving a workpiece for cutting work to the vertex of the acute angle under normal machining conditions, automatically stopping the application of a laser beam when the vertex is reached, ejecting a cooling medium for a predetermined time, drilling the workpiece under set drilling conditions after the passage of the predetermined time, and continuing the cutting work under the normal cutting conditions.

A numerical control device (CNC) previously reads the machining program, to thereby detect that the acute angle is not greater than the allowable angle in the machining path. A machining operation is executed under the normal machining conditions before the vertex of the acute angle is reached and is stopped at the vertex of the acute angle, and the region near the vertex is cooled for a predetermined time by the cooling medium, whereby a lowering of the cut surface roughness due to an overheating by the laser beam is prevented. After the cooling the cutting work is executed under drilling conditions, to continue the machining operation.

BEST MODE OF CARRYING OUT THE INVENTION

One embodiment of the present invention will now be described with reference to the drawings.

Figure 2:
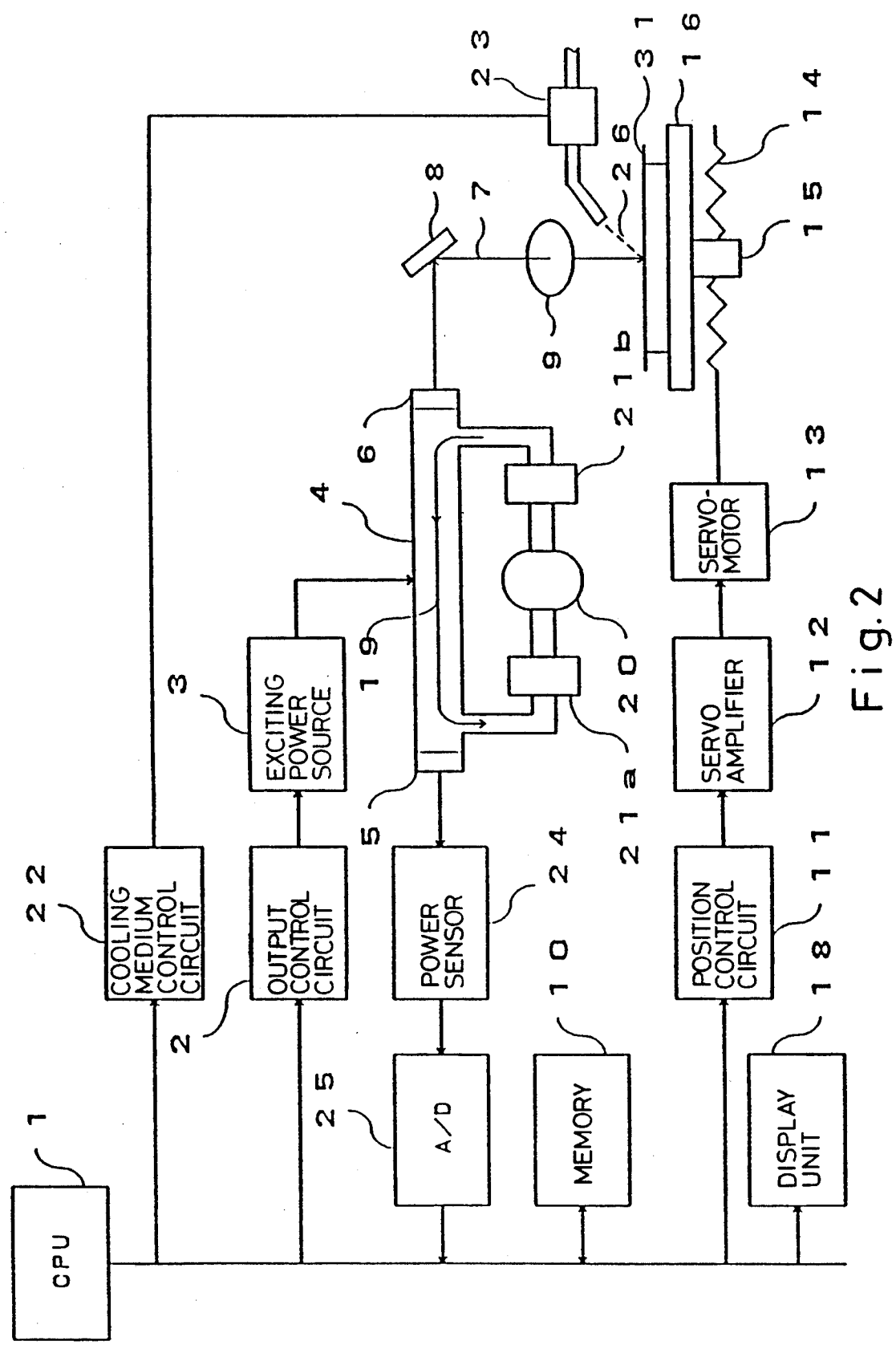
FIG. 2 is a block diagram showing an arrangement of a CNC laser apparatus for effecting the present invention.

FIG. 2 is a block diagram showing an arrangement of a CNC laser apparatus for effecting the present invention. In FIG. 2, a processor 1 reads out a machining program from a memory 10 in accordance with a control program stored in a ROM (not shown), and controls the operation of the whole CNC laser apparatus. An output control circuit 2, which contains a D/A converter, converts an output command value delivered from the processor 1 into a current command value and delivers the current command value as an output. An exciting power source 3 produces a high-frequency voltage by a switching operation after rectifying the commercial power source, and supplies a discharge tube 4 with a high-frequency current corresponding to the current command value.

A laser gas 19, which circulates in the discharge tube 4, is excited by an electric discharge produced when the high-frequency voltage from the exciting power source 3 is applied. A rear mirror 5 is a germanium (Ge) mirror with a reflection factor of 99.5%, and an output mirror 6 is a zinc selenide (ZnSe) mirror with a reflection factor of 65%. These mirrors, which constitute a Fabry-Pérot resonator, amplify a 10.6-μm light beam emitted from excited laser gas molecules, and a part of the light beam is output as a laser beam 7 from the output mirror 6 to the outside.

The course of the output laser beam 7 is changed by a bender mirror 8, to be converged onto a spot of 0.2 mm or less by a light converging lens 9 and applied to the surface of a workpiece 31.

The memory 10, which is a nonvolatile memory for storing the machining program and various parameters, etc., is formed of a CMOS backed up by a battery. In addition, a ROM is used for storing a system program and a RAM is used for temporarily storing data; these memories are omitted in FIG. 2.

In response to a command from the processor 1, a position control circuit 11 controls the rotation of a servomotor 13 by using a servo amplifier 12, and controls the movement of a table 16 through a ball screw 14 and a nut 15, to thereby control the position of the workpiece 31. Although only one axis is shown in FIG. 2, a plurality of control axes are actually used. A CRT or liquid crystal display device is used as a display unit 18.

A Roots blower is used as a blower 20 which circulates the laser gas 19 through cooling units 21a and 21b. The cooling unit 21a is used to cool the laser gas 19 heated to high temperature by laser oscillation, and the cooling unit 21b is used to remove compression heat produced by the blower 20.

A cooling medium control circuit 22 controls a cooling medium 26 by turning on and off a solenoid valve 23. Gas, water, or steam, etc. may be used as the cooling medium 26.

A power sensor 24, which is formed of a thermoelectric or photoelectric conversion element, receives the laser beam 7 partially transmitted and delivered through the rear mirror 5, and measures the output power of the laser beam 7. An A/D converter 25 converts the output of the power sensor 24 to a digital value, and inputs the digital value to the processor 1.

Figure 1:
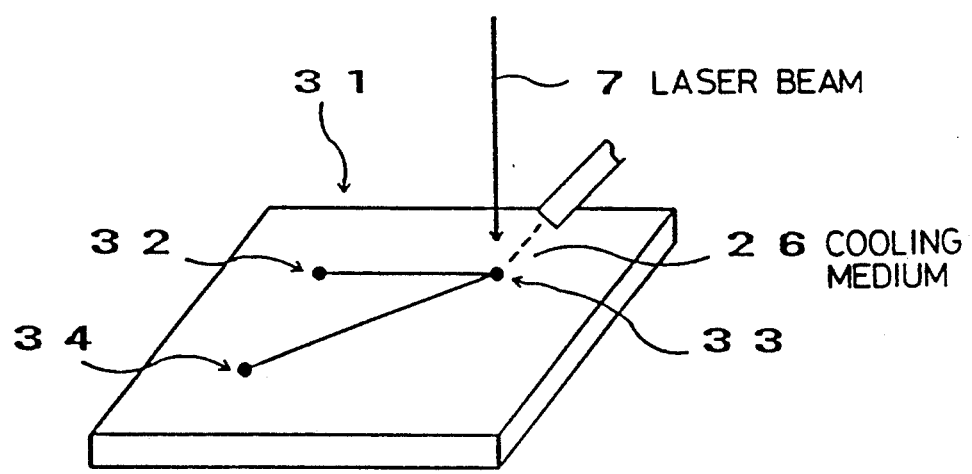
FIG. 1 is a diagram illustrating a laser beam machining method according to the present invention.

FIG. 1 illustrates a laser beam machining method according to the present invention. When cutting the workpiece 31 from a cutting start point 32 through an acute-angle vertex 33 to a cutting end point 34, the cutting start point 32 is drilled under drilling conditions, and the workpiece 31 is moved so that the acute-angle vertex 33 is reached after the drilling work is completed.

Before the acute-angle vertex 33 is reached, a numerical control device (CNC) previously reads the machining program and executes an automatic angle discrimination. If the angle is narrower than a preset allowable angle, a signal for stopping the application of the laser beam is output to stop the laser beam application for a predetermined time when the acute-angle vertex 33 is reached, and at the same time, the region near the acute-angle vertex 33 is cooled by the cooling medium 26, such as gas, steam, or water. After the passage of the predetermined time, the acute-angle vertex 33 is drilled under the same drilling conditions as for the drilling at the cutting start point 32. After the end of this drilling work, the workpiece 31 is moved so that the cutting end point 34 is reached under the same cutting conditions as in the case where the workpiece 31 is moved from the cutting start point 32 to the acute-angle vertex 33. The application of the laser beam is stopped when the cutting end point 34 is reached.

When a 16-mm thick workpiece was subjected to an acute-angle machining of 30° by using a $CO_2$ gas laser having a 2-kW output, according to the present invention, the same surface roughness as in the case of portions other than the acute-angle portion was obtained with the use of air as the cooling medium at a cooling time of about 2 seconds, without changing the other cutting conditions.

According to the present invention, as described above, the machining path having an angle not greater than the allowable angle is detected by the numerical control device, the application of the laser beam is stopped at the acute-angle vertex, and the machining operation is restarted after the cooling by the cooling medium. Therefore, the operator can create a cutting program while taking into account only the machining path.

As a result, the operator can perform the acute-angle cutting work, which conventionally has often resulted in a failure, while ignoring the acute angle, and there is no need for loop processing, and thus the usage of stock can be minimized.

I claim:

1. In a laser beam machining method of processing a machining path having an acute angle in a CNC laser machining apparatus, the laser beam machining method comprising:
    previously reading a machining program, to thereby detect that the acute angle of the machining path is not greater than a preset allowable angle;
    moving a workpiece for cutting to the vertex of the acute angle under normal machining conditions;
    automatically stopping the application of a laser beam when said vertex is reached;
    ejecting a cooling medium for a predetermined time;
    drilling the workpiece under set drilling conditions after the passage of said predetermined time; and
    continuing the cutting work under the normal cutting conditions.

2. A laser beam machining method according to claim 1, wherein said cooling medium is one of gas, water, and steam.

3. A laser beam machining method according to claim 1, wherein said allowable angle is stored as a parameter of the machining conditions.

* * * * *